(12) United States Patent
Blatchley et al.

(10) Patent No.: US 10,391,835 B2
(45) Date of Patent: Aug. 27, 2019

(54) SYSTEM AND METHOD FOR DE-ICING A HEAT PUMP

(71) Applicant: Ford Global Technologies, LLC, Dearborn, MI (US)

(72) Inventors: Timothy Noah Blatchley, Dearborn, MI (US); Franco Ragazzi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 450 days.

(21) Appl. No.: 14/713,842

(22) Filed: May 15, 2015

(65) Prior Publication Data

US 2016/0332504 A1    Nov. 17, 2016

(51) Int. Cl.
*B60H 1/00* (2006.01)
*F25B 47/02* (2006.01)
*F25B 49/02* (2006.01)
*F25B 5/04* (2006.01)
*F25B 6/04* (2006.01)
(Continued)

(52) U.S. Cl.
CPC ..... *B60H 1/00921* (2013.01); *B60H 1/00785* (2013.01); *B60H 1/00885* (2013.01); *B60H 1/00899* (2013.01); *B60H 1/034* (2013.01); *B60H 1/321* (2013.01); *F25B 47/022* (2013.01); *F25B 49/02* (2013.01); *B60H 2001/00928* (2013.01); *B60H 2001/00961* (2019.05); *F25B 5/04* (2013.01); *F25B 6/04* (2013.01); *F25B 2339/047* (2013.01); *F25B 2341/0662* (2013.01); *F25B 2400/0409* (2013.01);
(Continued)

(58) Field of Classification Search
CPC ............... F25B 47/022; F25B 2700/11; F25B 2400/0409; B60H 1/00785; B60H 1/00921; B60H 1/321; B60H 1/034; B60H 1/00885; B60H 1/00899; B60H 2001/00928
See application file for complete search history.

(56) References Cited

U.S. PATENT DOCUMENTS 5,755,104 A  *  5/1998  Rafalovich  ............. F25B 13/00
                                                              62/205
5,839,292 A  *  11/1998  Hwang  ................... F25B 41/04
                                                              62/152
(Continued)

FOREIGN PATENT DOCUMENTS

DE    102010030746 A1 *  1/2012  ......... B60H 1/00257
DE    102014102078 A1 *  8/2015  ............. F25B 40/00
(Continued)

OTHER PUBLICATIONS

JP2008221997A Machine Translation English—Retrieved Jun. 2017.*
(Continued)

*Primary Examiner* — Cassey D Bauer
*Assistant Examiner* — Jenna M Hopkins
(74) *Attorney, Agent, or Firm* — David Kelley; McCoy Russell LLP

(57) ABSTRACT

Methods and system for providing de-icing a heat pump heat exchanger and heating a vehicle passenger cabin are presented. In one example, a heat pump that experiences icing of exterior heat exchanger fins may be operated in a cooling mode where a passenger cabin heat exchanger operates as an evaporator to improve de-icing of the exterior heat exchanger fins.

13 Claims, 7 Drawing Sheets

(51) Int. Cl.
  *B60H 1/03* (2006.01)
  *B60H 1/32* (2006.01)
(52) U.S. Cl.
  CPC .............. *F25B 2400/0411* (2013.01); *F25B 2600/2513* (2013.01); *F25B 2700/11* (2013.01)

(56) References Cited

U.S. PATENT DOCUMENTS

| | | | | |
|---|---|---|---|---|
| 6,029,465 | A * | 2/2000 | Bascobert | B60H 1/321 62/151 |
| 6,330,909 | B1 * | 12/2001 | Takahashi | B60H 1/005 165/202 |
| 6,609,388 | B1 * | 8/2003 | Hanson | B60H 1/321 62/151 |
| 6,725,679 | B2 * | 4/2004 | Itoh | B60H 1/3207 62/160 |
| 7,287,581 | B2 | 10/2007 | Ziehr et al. | |
| 8,517,087 | B2 | 8/2013 | Zeigler et al. | |
| 2002/0036080 | A1 * | 3/2002 | Itoh | B60H 1/3207 165/202 |
| 2004/0000399 | A1 * | 1/2004 | Gavula | F25B 13/00 165/299 |
| 2004/0134207 | A1 * | 7/2004 | Morita | B60H 1/00792 62/158 |
| 2005/0067158 | A1 * | 3/2005 | Ito | B60H 1/00007 165/204 |
| 2005/0172648 | A1 * | 8/2005 | Concha | F25B 30/02 62/150 |
| 2007/0080237 | A1 * | 4/2007 | Burk | B60H 1/20 237/28 |
| 2007/0137238 | A1 * | 6/2007 | Hu | F25B 5/02 62/277 |
| 2007/0199335 | A1 * | 8/2007 | Innes | F25B 30/02 62/151 |
| 2008/0302118 | A1 | 12/2008 | Chen et al. | |
| 2009/0277207 | A1 * | 11/2009 | Park | F25B 13/00 62/324.6 |
| 2009/0320504 | A1 * | 12/2009 | Gupte | F25B 39/02 62/81 |
| 2010/0229575 | A1 * | 9/2010 | Shaw | F25B 13/00 62/81 |
| 2010/0248604 | A1 * | 9/2010 | Kanemaru | B60H 1/00064 454/75 |
| 2010/0326127 | A1 * | 12/2010 | Oomura | B60H 1/00785 62/498 |
| 2011/0016896 | A1 * | 1/2011 | Oomura | B60H 1/00785 62/155 |
| 2011/0100588 | A1 * | 5/2011 | Wiggs | F25B 30/06 165/45 |
| 2013/0081419 | A1 * | 4/2013 | Katoh | B60H 1/004 62/278 |
| 2013/0139528 | A1 * | 6/2013 | Katayama | B60H 1/00921 62/81 |
| 2013/0167570 | A1 * | 7/2013 | Bouloy | F25B 39/02 62/156 |
| 2013/0227973 | A1 * | 9/2013 | Kang | F25B 47/022 62/80 |
| 2014/0069123 | A1 * | 3/2014 | Kim | F25B 5/04 62/61 |
| 2015/0027143 | A1 * | 1/2015 | Nemesh | B60H 1/00007 62/79 |
| 2015/0040589 | A1 * | 2/2015 | Quetant | B60H 1/00921 62/81 |
| 2015/0059375 | A1 * | 3/2015 | Oomura | B60H 1/00785 62/155 |
| 2015/0110548 | A1 * | 4/2015 | Reid | B23K 35/025 403/272 |
| 2015/0115048 | A1 * | 4/2015 | Brodie | B60H 1/00764 237/2 B |
| 2015/0362268 | A1 * | 12/2015 | Maeda | G05D 23/1917 165/294 |
| 2016/0209099 | A1 * | 7/2016 | Liu | B60H 1/004 |
| 2016/0273812 | A1 * | 9/2016 | Klink | F25B 1/10 |

FOREIGN PATENT DOCUMENTS

| | | | | |
|---|---|---|---|---|
| FR | 2964910 A1 | * | 3/2012 | ......... B60H 1/00785 |
| FR | 2973482 A1 | * | 10/2012 | ......... B60H 1/00907 |
| JP | 08020239 A | * | 1/1996 | ......... B60H 1/00392 |
| JP | 2002174474 A | * | 6/2002 | ......... B60H 1/00392 |
| JP | 2008221997 A | * | 9/2008 | |
| JP | 2011011686 A | * | 1/2011 | |
| JP | 2013060145 A | * | 4/2013 | |
| WO | WO 2013131589 A1 | * | 9/2013 | ......... B60H 1/00921 |
| WO | 2013145537 A1 | | 10/2013 | |

OTHER PUBLICATIONS

DE102010030746A1 Machine Translation English—Retrieved Jun. 2017.*
Electric Vehicle Charging Technology Analysis and Standards—Kettles (Feb. 2015).*
JP2002174474A English Machine Translation—Retreieved Oct. 2017.*
JP2011011686A English Machine Translation—Retrieved Apr. 2018.*
JP-2013060145-A English Machine Translation (Year: 2013).*
FR-2973482-A1 English Machine Translation (Year: 2012).*
Ragazzi, F., "Method and System for De-Icing a Heat Exchanger," U.S. Appl. No. 14/212,283, filed Mar. 14, 2014, 45 pages.
Dudar, A. et al. "Systems and Methods for an Externally Accessible Refueling Request Switch," U.S. Appl. No. 14/265,220, filed Apr. 29, 2014, 48 pages.

* cited by examiner

SYSTEM AND METHOD FOR DE-ICING A HEAT PUMP

FIELD

The present description relates to a system and methods for improving de-icing of an exterior heat exchanger in a vehicle heat pump. The system and methods may be particularly useful for vehicles that operate at lower ambient temperatures and supply passenger cabin heating.

BACKGROUND AND SUMMARY

A hybrid or electric vehicle may include a heat pump for heating and cooling a passenger cabin responsive to a desired passenger cabin temperature. During some conditions where ambient air temperature is low and cabin heating is requested, an exterior heat exchanger may be operated as an evaporator to extract heat from ambient air to heat the passenger cabin. However, humidity in the ambient air may freeze fins of the exterior heat exchanger as air passes over the heat exchanger fins. Further, the exterior heat exchanger may freeze during other conditions, such as if snow becomes impacted in the exterior heat exchanger. If the exterior heat exchanger fins remain in an iced state, passenger cabin heating may be reduced causing passenger discomfort. One way to remove ice from the exterior heat exchanger is to operate the heat pump in a de-icing mode. In de-icing mode, refrigerant is heated via a compressor and passed through the exterior heat exchanger to warm the exterior heat exchanger. However, refrigerant returned to the heat pump compressor may be at a higher temperature than is desired. Consequently, the heat pump's compressor may be degraded if the heat pump is operated in de-icing mode for an extended period of time. Additionally, known de-icing methods do not allow the passenger cabin to be heated while the heat pump is operating in de-icing mode.

The inventors herein have recognized the above-mentioned disadvantages and have developed a method for operating a vehicle heat pump, comprising: receiving vehicle heat pump sensor data to a controller; judging a presence or absence of exterior heat exchanger icing via the controller; and operating the vehicle heat pump in a cooling mode via the controller in response judging the presence of exterior heat exchanger icing.

By operating the vehicle heat pump in a cooling mode in response to a presence of exterior heat exchanger icing, it may be possible to provide the technical result of increasing a rate of exterior heat exchanger de-icing. Further, operating the heat pump in a cooling mode may reduce the possibility of heat pump compressor degradation. For example, a heat pump may at first be operated in a de-icing mode to reduce exterior heat exchanger icing. However, if the de-icing takes longer than is desired, the heat pump may switch from de-icing mode to a cooling mode to continue exterior heat exchanger de-icing since the heat is rejected to the exterior heat exchanger when the heat pump is operated in a cooling mode. In some examples, passenger comfort may be maintained when the heat pump operates in a cooling mode via activating a positive temperature coefficient (PTC) heater while the exterior heat exchanger is being de-iced in the cooling mode. In other examples, if the vehicle includes an engine, the engine may be activated to maintain passenger comfort while the exterior heat exchanger is being de-iced in the cooling mode.

The present description may provide several advantages. For example, the approach may improve heat pump efficiency in heating mode by de-icing the exterior heat exchanger. Additionally, the approach may maintain passenger comfort by using an electric coolant heater to reject air to the passenger cabin at a desired temperature during exterior heat exchanger de-icing. Further, the approach may be applicable to both electric and hybrid vehicles.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
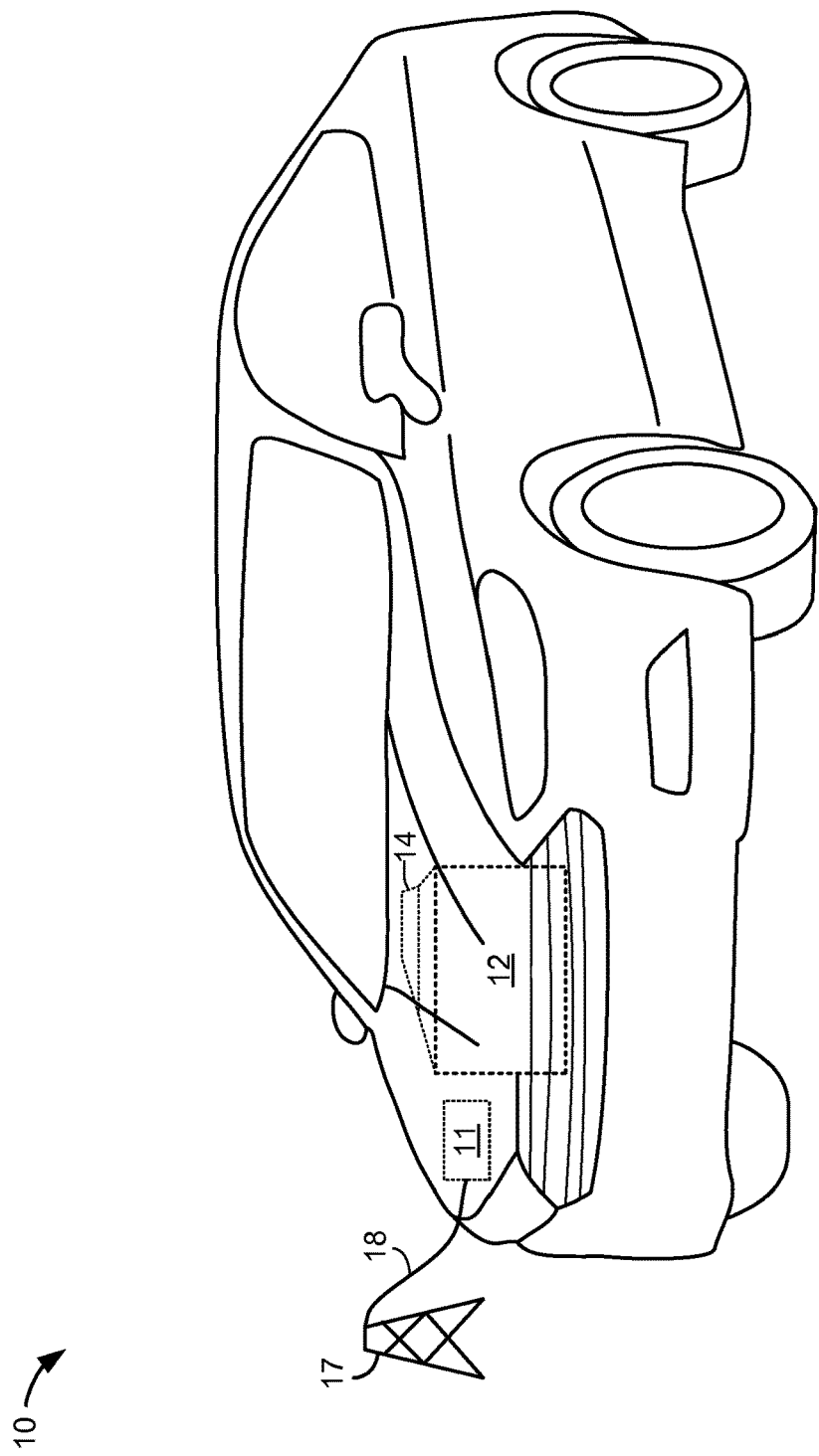
FIG. 1 is a schematic diagram of a vehicle.
Figure 2:
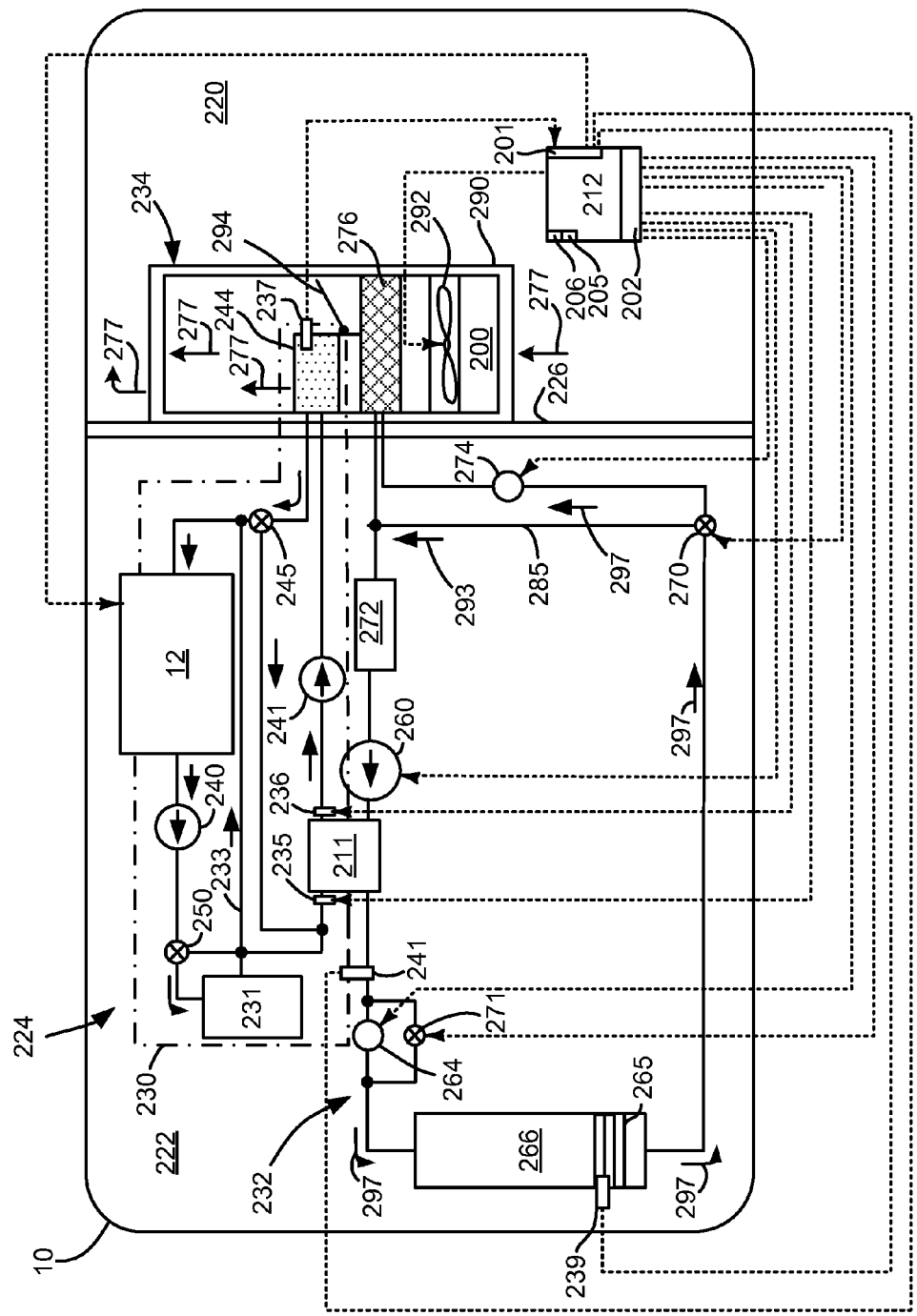
FIG. 2 shows an example vehicle heating system for the vehicle of FIG. 1.
Figure 3:
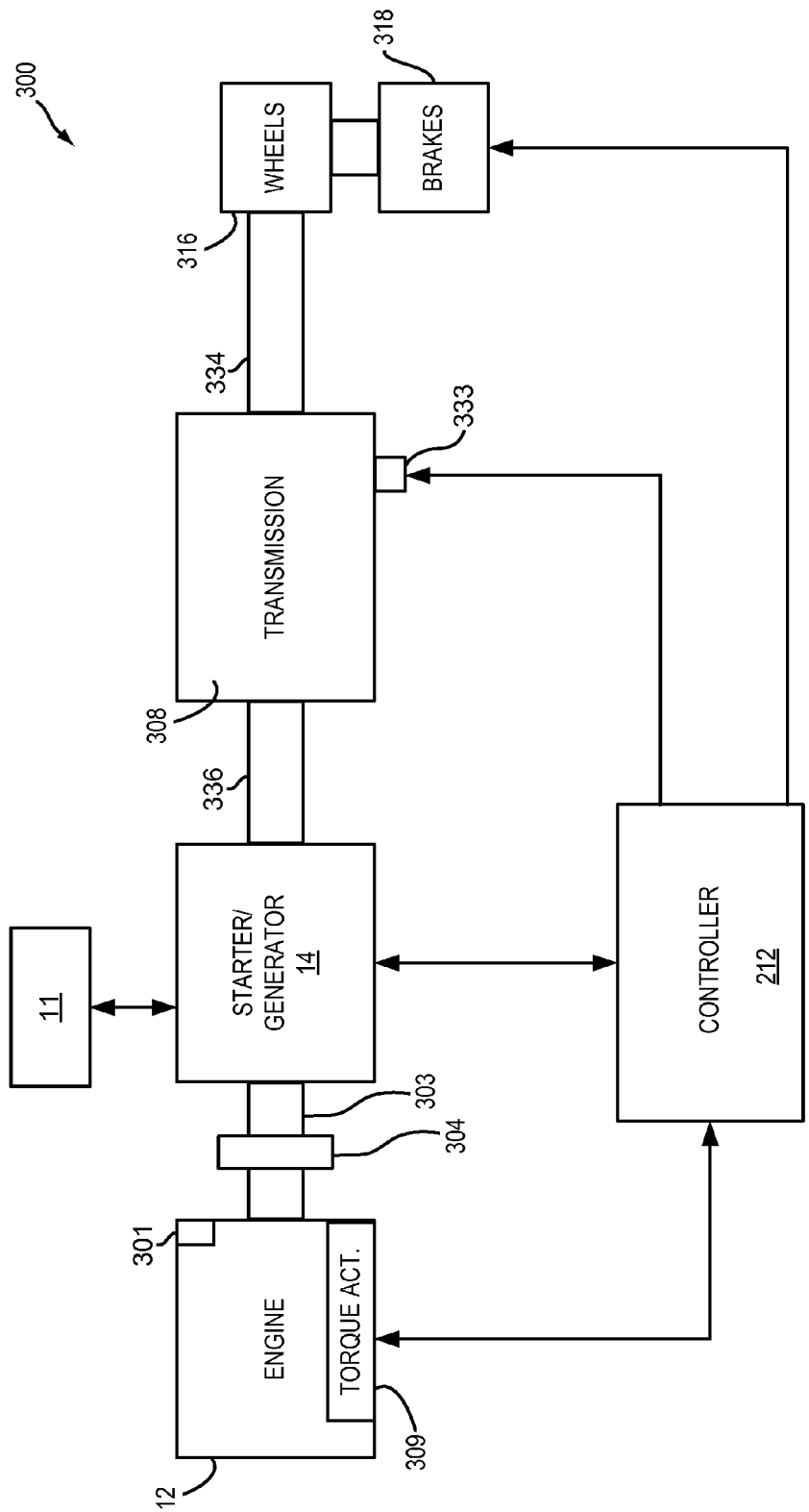
FIG. 3 shows an example vehicle driveline for the vehicle of FIG. 1.

The present description is related to providing improving vehicle heat pump de-icing. In particular, a vehicle's exterior heat exchanger (e.g., a heat exchanger outside of a passenger cabin) may be de-iced in different modes depending on heat pump operating conditions. The vehicle may be a passenger vehicle as is shown in FIG. 1 or a commercial vehicle (not shown). The vehicle includes a climate control system including a heat pump as is shown in FIG. 2. The climate control system may include an engine that is part of a hybrid powertrain as is shown in FIG. 3. Exterior heat exchanger de-icing may be provided based on the method of FIGS. 4-6. The de-icing process may be performed as shown in the operating sequence of FIG. 7.

Referring to FIG. 1, a vehicle 10 including an engine 12, an electrical machine 14, and an electrical energy storage device 11 is shown. In one example, the vehicle may be propelled solely via the engine 12, solely via the electrical machine 14, or by both the engine 12 and the electrical machine 14. In other examples, the vehicle may include only electrical machine 14 for propulsion. The electrical machine 14 may be supplied electrical power via the electrical energy storage device 11. The electrical energy storage device 11 may also be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary electrical power grid 17 via a home charging system or a remote charging system (e.g., a charging station) and electrical conductor 18. In one example, electrical energy storage device 11 is a battery. Alternatively, electrical energy storage device 11 may be a capacitor or other electric energy storage device.

Referring now to FIG. 2, a vehicle heating system or climate control system 224 is shown. Devices and fluidic passages or conduits are shown as solid lines. Electrical connections are shown as dashed lines.

The vehicle 10 may include a driveline as shown in FIG. 3 or another suitable driveline to propel the vehicle 10 and/or power vehicle components. Vehicle 10 is shown with internal combustion engine 12, and it may be selectively coupled to an electric machine (not shown). Internal combustion engine 12 may combust petrol, diesel, alcohol, hydrogen, or a combination of fuels.

The vehicle 10 may include a passenger compartment or cabin 220, an engine compartment 222, and a climate control system 224. The passenger compartment 220 may be within vehicle 10 and it may receive one or more occupants. A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or control or modify the temperature of air that is circulated in the passenger compartment 220. Further, the internal combustion engine 12 may be heated via climate control system 224 to reduce fuel consumption and emissions. The climate control system 224 may include a coolant subsystem 230, a heat pump subsystem 232, and ventilation subsystem 234.

The coolant subsystem 230, which may also be referred to as a coolant loop, may circulate a coolant, such as glycol, to cool the internal combustion engine 12. For example, waste heat that is generated by the internal combustion engine 12 when the engine is running or operational may be transferred to the coolant and then circulated to radiator 231 to cool internal combustion engine 12. In at least one example, the coolant subsystem 230 may include a coolant pump 240, a heater core 244, and refrigerant to coolant heat exchanger 211 that may be fluidly interconnected by conduits or passages such as tubes, hoses, pipes, or the like. Refrigerant to coolant heat exchanger 211 isolates coolant from refrigerant. The coolant subsystem 230 includes radiator 231 for transferring thermal energy to the ambient air surrounding the vehicle 10. Radiator 231 may be omitted for electric vehicles. The coolant pump 240 may circulate coolant through the coolant subsystem 230. The coolant pump 240 may be powered by an electrical or non-electrical power source. For example, the coolant pump 240 may be operatively coupled to an internal combustion engine 12 via a belt, or alternatively may be driven by an electrically powered motor. The coolant pump 240 may receive coolant from the internal combustion engine 12 and circulate the coolant in a closed loop. Specifically, when the climate control system 224 is in a heating mode, coolant may be routed from the coolant pump 240 to valve 250 and refrigerant to coolant heat exchanger 211, and then to the heater core 244 before returning to the internal combustion engine 12 as represented by the arrowed lines. When internal combustion engine 12 is outputting a higher level of thermal energy, coolant may flow from pump 240 to radiator 231 before returning to internal combustion engine 12 via heater core 244 or bypass 233. Heater core heat sensor 237 provides heater core temperature to controller 212. A PTC heater 235 may be positioned upstream of refrigerant to coolant heat exchanger 211. Alternatively, PTC heater 236 may be positioned downstream of refrigerant to coolant heat exchanger 211. A second coolant pump 241 may provide motive force to coolant provided to heater core 244. Heater core isolation valve 245 directs coolant back to engine 12 or to refrigerant to coolant heat exchanger 211 from heater core 244.

The heater core 244 may transfer thermal energy from the coolant to air in the passenger compartment 220. The heater core 244 may be positioned in the passenger compartment 220 in the ventilation subsystem 234 and may have any suitable configuration. For example, the heater core 244 may have a plate-fin or tube-fin construction in one or more examples.

The heat pump subsystem 232 may operate in various modes, including, but not limited to a cooling mode and heating mode. Further, heat pump subsystem may include a plurality of refrigerant circuits that may be isolated from other refrigerant circuits. For example, heat pump subsystem 232 includes a first refrigerant circuit that includes valve 270, expansion valve 274, and interior heat exchanger 276. Heat pump subsystem includes a second refrigerant circuit that includes valve 270 and bypass passage 285. In other variants, heat pump subsystem 232 may include additional refrigerant circuits that provide additional functionality. Thus, heat pump subsystem 232 may include a plurality of refrigerant circuits through which refrigerant passes.

In the cooling mode, the heat pump subsystem 232 may circulate a heat transfer fluid, which may be called a refrigerant, to transfer thermal energy from inside the passenger compartment 220 to outside the passenger compartment 220. Refrigerant may pass through interior heat exchangers 276 during cooling mode. In cooling mode, first control valve 271 is in an open state such that first expansion valve 264 is bypassed allowing refrigerant to flow through exterior heat exchanger 266. Second control valve 270 directs refrigerant to second expansion valve 274 from exterior heat exchanger 266, thereby preventing flow through bypass passage 285. Refrigerant flows from second expansion valve 274 to interior heat exchanger 276. Refrigerant leaves interior heat exchanger 276 and flows to accumulator 272 before returning to compressor 260. Refrigerant exits compressor 260 and enters refrigerant to coolant heat exchanger 211 before returning to first control valve 271. In this way, the exterior heat exchanger operates as a condenser and the interior heat exchanger operates as an evaporator.

In a heating mode, the heat pump subsystem 232 may transfer thermal energy from exterior heat exchanger 266 to refrigerant to coolant heat exchanger 211. Refrigerant to coolant heat exchanger 211 may be a gas to liquid heat exchanger which allows heat to be transferred to coolant, and the coolant may warm the passenger cabin via heater core 244. In heating mode, first control valve 271 is closed such that first expansion valve 264 expands refrigerant that flows to exterior heat exchanger 266 from refrigerant to coolant heat exchanger 211 and compressor 260. Second control valve 270 directs refrigerant into bypass passage 285 from exterior heat exchanger 266, thereby preventing refrigerant flow through interior heat exchanger 276. Refrigerant flows through bypass 285 before flowing to accumulator 272. Refrigerant then flows to compressor 260 before returning to refrigerant to coolant heat exchanger 211.

In de-icing mode, valve 271 is opened to bypass expansion valve 264 and valve 270 directs refrigerant into bypass passage 285. Thus, refrigerant flows from compressor 260 through valve 271, bypassing valve 264, and onto exterior heat exchanger 266. Refrigerant exits exterior heat exchanger 266 and flows into bypass 285 bypassing interior heat exchanger 276. Refrigerant moves from bypass 285 to accumulator 272 before returning to compressor 260. Heat generated by compressor 260 is rejected to exterior heat exchanger 266 to remove icing.

The compressor 260, which may also be called a compressor, may pressurize and circulate the refrigerant through the heat pump subsystem 232. The compressor 260 may be powered by an electrical or non-electrical power source. For example, the compressor 260 may be operatively coupled to internal combustion engine 12 or driven by an electrically powered motor. The compressor 260 may provide high pressure refrigerant to first expansion valve 264 and exterior heat exchanger 266 when first control valve 271 is closed. Refrigerant pressure may be determined via pressure sensor 241. Refrigerant may bypass expansion valve 264 when first control valve 271 is in an open state. In some examples, an oil separator may be placed at the outlet of compressor 260. Refrigerant may flow through heat pump subsystem 232 via motive force of compressor 260 in the direction of arrows 297. In some examples expansion valve 264 and valve 271 may be replaced with an electrically controlled expansion valve (EXV) which may fully open to reduce expansion. The EXV may also at least partially close to increase refrigerant expansion.

The first expansion device 264 may be positioned between and may be in fluidic communication with compressor 260 and the exterior heat exchanger 266. Temperature of exterior heat exchanger fins 265 may be sensed via temperature sensor 239 and input to controller 212. The first expansion device 264 may be provided to change the pressure of the refrigerant. For example, the first expansion device 264 may be a thermal expansion valve (TXV) or a fixed or variable position valve that may or may not be exteriorly controlled. The first expansion device 264 may reduce the pressure of the refrigerant that passes through the first expansion device 264 from the compressor 260 to the exterior heat exchanger 266. Therefore, high pressure refrigerant received from the compressor 260 may exit the first expansion device 264 at a lower pressure and as a liquid and vapor mixture in the heating mode.

The exterior heat exchanger 266 may be positioned outside the passenger compartment 220. In a cooling mode or air conditioning context, the exterior heat exchanger 266 may function as a condenser and may transfer heat to the surrounding environment to condense the refrigerant from a vapor to a liquid. In a heating mode, the exterior heat exchanger 266 may function as an evaporator and may transfer heat from the surrounding environment to the refrigerant, thereby causing the refrigerant to vaporize.

The second control valve 270 may be positioned between exterior heat exchanger 266 and second expansion valve 274. The passage between second control valve 270 and second expansion valve 274 allows refrigerant to selectively reach interior heat exchanger 276. In one example, second control valve 270 is a three-way valve that selectively allows refrigerant to flow to second expansion valve 274 or bypass passage 285.

The accumulator 272 may act as a reservoir for storing any residual liquid refrigerant so that vapor refrigerant rather than liquid refrigerant may be provided to the compressor 260. The accumulator 272 may include a desiccant that absorbs small amounts of water moisture from the refrigerant.

The interior heat exchanger 276 may be fluidly connected to the second expansion device 274. The interior heat exchanger 276 may be positioned inside the passenger compartment 220. In a cooling mode or air conditioning context, the interior heat exchanger 276 may function as an evaporator and may receive heat from air in the passenger compartment 220 to vaporize the refrigerant. Refrigerant exiting the interior heat exchanger 276 may be routed to the accumulator 272. In the heating mode, interior heat exchanger 276 is bypassed.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air only from or more than a predetermined amount (e.g., 75%) from inside the passenger compartment 220 and recirculate such air through the ventilation subsystem 234 (e.g. recirculation mode). One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 220. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 220. The temperature door 294 may be moved between a plurality of positions to provide air having a desired temperature. In FIG. 2, the temperature door 294 is shown in a full heat position in which airflow is directed through the heater core 244.

Figure 4:
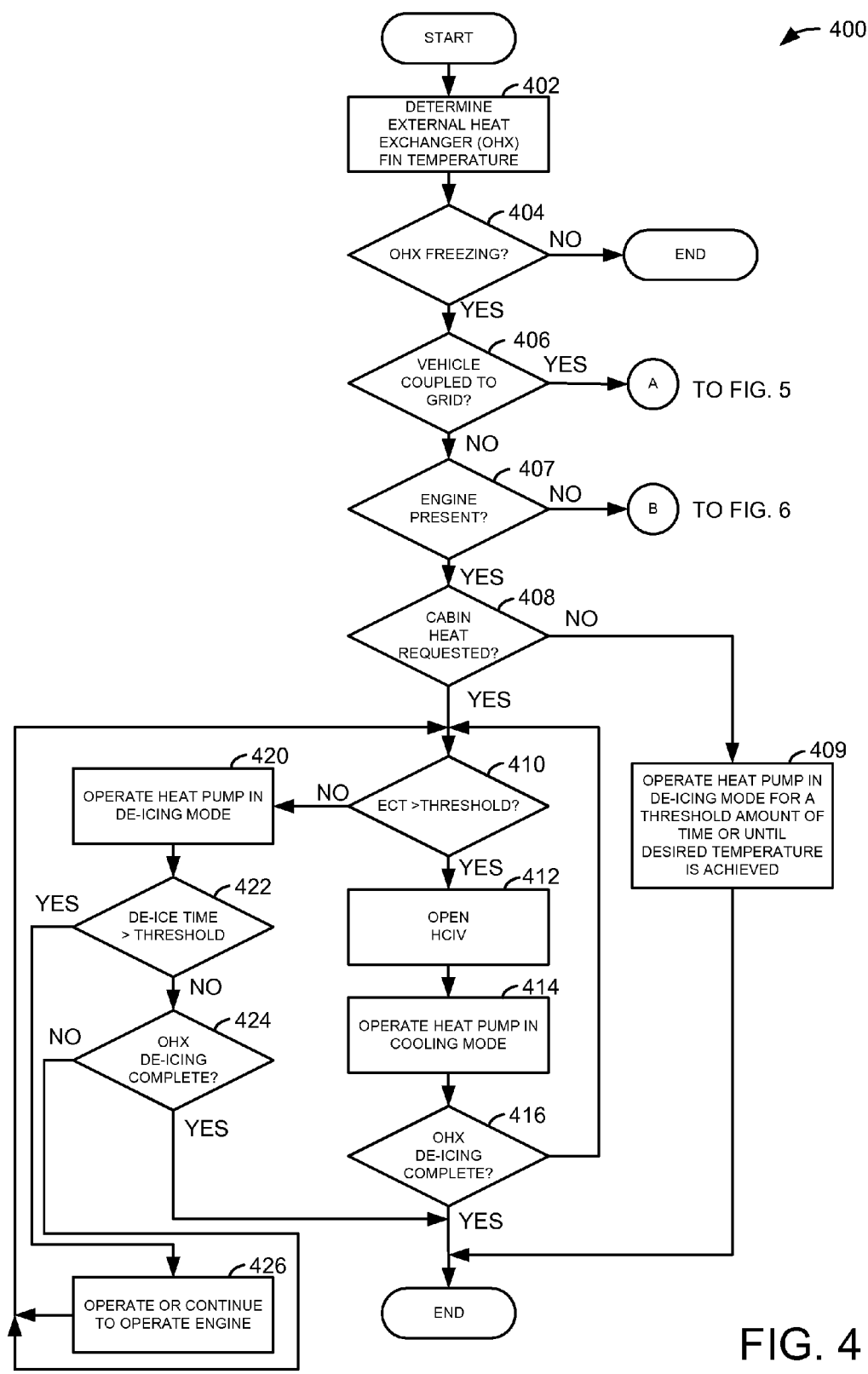
FIGS. 4-6 show a method for operating a vehicle heat pump.
Figure 5:
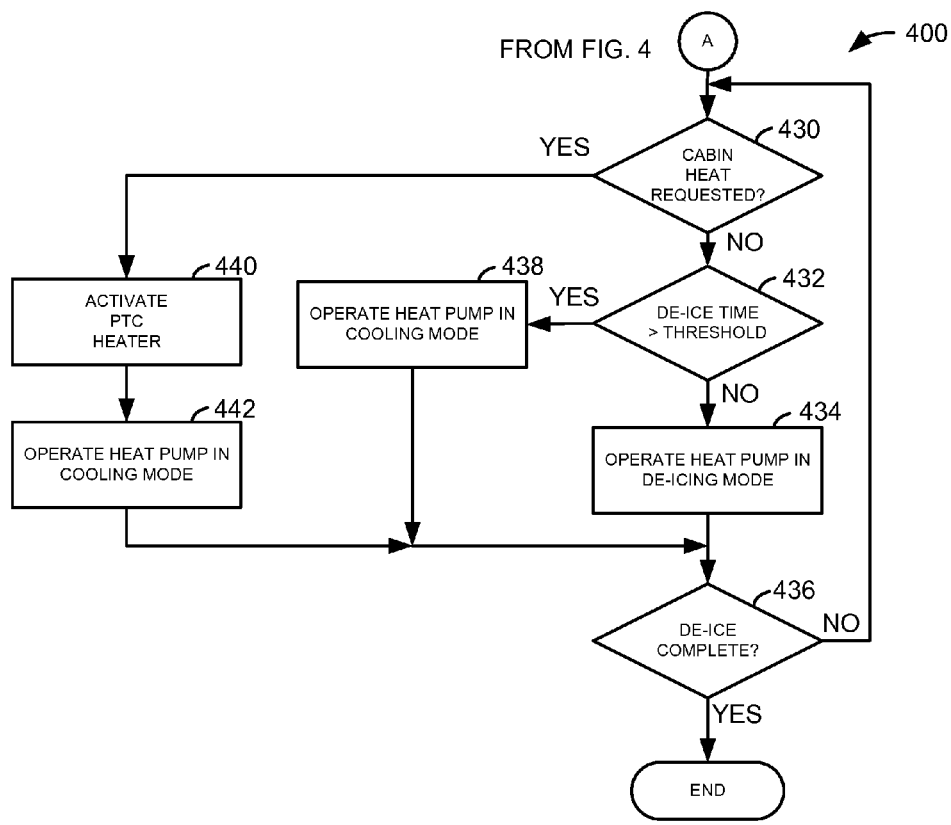
Figure 6:
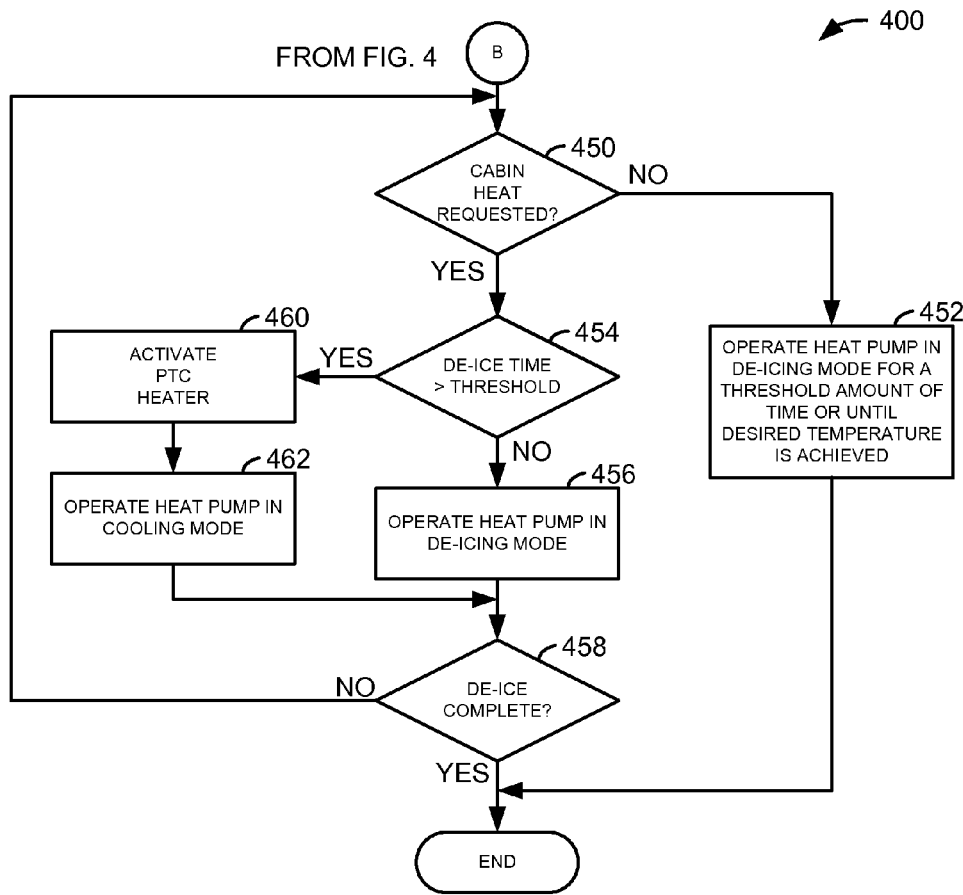

Controller 212 includes executable instructions of the method of FIGS. 4-6 to operate the valves, fans, and pumps or compressors of the system shown in FIG. 2. Controller 212 includes inputs 201 and outputs 202 to interface with devices in the system of FIG. 2. Controller 212 also includes a central processing unit 205 and non-transitory memory 206 for executing the method of FIGS. 4-6.

It should be noted that in some example systems, engine 12 and heater core 244 may not be present. In such systems, interior heat exchanger 276 may operate as a condenser in a heating mode and exterior heat exchanger 266 may operate as an evaporator. Consequently, in the method of FIG. 6 and the block diagram of FIG. 4, internal heat exchanger 276 may be substituted for heater core 244.

Referring now to FIG. 3, a block diagram of a vehicle driveline 300 in vehicle 10 is shown. Driveline 300 may be powered by engine 12. Engine 12 may be started with an engine starting system including starter 301 or via electric machine or driveline integrated starter generator (DISG) 14. Further, engine 12 may generate or adjust torque via torque actuator 309, such as a fuel injector, throttle, camshaft, etc.

An engine output torque may be transmitted to driveline disconnect clutch 304. Driveline disconnect clutch selectively couples and decouples driveline 300. Driveline disconnect clutch 304 may be electrically or hydraulically actuated. The downstream side of driveline disconnect clutch 304 is shown mechanically coupled to DISG input shaft 303.

DISG 14 may be operated to provide torque to driveline 300 or to convert driveline torque into electrical energy to be stored in electric energy storage device 11. DISG 14 has a power output that is greater than starter 301. Further, DISG 14 directly drives driveline 300 or is directly driven by driveline 300. There are no belts, gears, or chains to couple DISG 14 to driveline 300. Rather, DISG 14 rotates at the same rate as driveline 300 and may be mechanically coupled to transmission 308 via shaft 336. Electrical energy storage device 11 may be a battery, capacitor, or inductor. The downstream side of DISG 14 is mechanically coupled to transmission 308.

Automatic transmission 308 includes gear clutches (e.g., gears 1-6) for adjusting a transmission gear ratio. The gear clutches 333 may be selectively engaged to propel vehicle 10. Torque output from the automatic transmission 308 may in turn be relayed to wheels 316 to propel the vehicle via output shaft 334. Output shaft 334 delivers torque from transmission 308 to wheels 316. Automatic transmission 308 may transfer an input driving torque to the wheels 316.

Further, a frictional force may be applied to wheels 316 by engaging wheel friction brakes 318. In one example, wheel friction brakes 318 may be engaged in response to the driver pressing his foot on a brake pedal (not shown). In other examples, controller 212 or a controller linked to controller 212 may apply engage wheel friction brakes. In the same way, a frictional force may be reduced to wheels 316 by disengaging wheel friction brakes 318 in response to the driver releasing his foot from a brake pedal. Further, vehicle brakes may apply a frictional force to wheels 316 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from DISG by adjusting current flowing to and from DISG windings as is known in the art. Controller 212 may also include non-transitory memory for storing executable instructions of the method described in FIGS. 4-6.

When idle-stop conditions are satisfied, controller 212 may initiate engine shutdown by shutting off fuel and spark to the engine. However, the engine may continue to rotate in some examples. Conversely, when restart conditions are satisfied, and/or a vehicle operator wants to launch the vehicle, controller 212 may reactivate the engine by resuming combustion in cylinders. The engine may be started via rotating the engine via DISG 14 or starter 301.

The system of FIGS. 1-3 provides for a vehicle system, comprising: a heat pump including an inside heat exchanger and an exterior heat exchanger; and a controller including executable instructions stored in non-transitory memory for operating the heat pump in a cooling mode in response to icing at the exterior heat exchanger. The vehicle system further comprises an engine and a heat exchanger providing thermal communication between a coolant circuit and a refrigerant circuit, and where an exterior heat exchanger operates as a condenser in the cooling mode and where an interior heat exchanger operates as an evaporator. The vehicle system further comprises additional instructions to activate the engine in response to entering the cooling mode. The vehicle system further comprises additional instructions for activating heat pump in the cooling mode in further response to a vehicle in which the heat pump operates being electrically coupled to a stationary power grid. The vehicle system also includes where heat is transferred from a passenger cabin to the exterior heat exchanger in the cooling mode. The vehicle system further comprises additional instructions for heating a passenger cabin while the heat pump is operated in the cooling mode. The passenger cabin may be heated via PTC heaters or a heater core in which coolant flows.

Referring now to FIGS. 4-6, a method for de-icing an exterior heat exchanger is shown. Method 400 of FIGS. 4-6 may be stored in non-transitory memory of a controller, such as controller 212 of FIG. 2. Method 400 may include instructions within a controller as well as actions taken by the controller in the physical works, such as changing an operating state of a valve or pump. Method 400 may also provide the simulated operating sequence shown in FIG. 7.

At 402, method 400 determines exterior heat exchanger (EHX) fin temperature. Exterior heat exchanger temperature may be determined via a temperature sensor. The temperature sensor output may be directed to a controller input. Method 400 proceeds to 404 after exterior heat exchanger fin temperature.

At 404, method 400 judges whether or not exterior heat exchanger icing is present. In one example, method 400 may determine icing is present if ambient humidity is greater than a threshold value and ambient temperature is less than a threshold value. Further, in some examples, method 400 may determine that exterior heat exchanger icing is present when exterior heat exchanger fin temperature is less than a threshold and internal heat exchanger fin temperature is less than a threshold temperature so as to indicate low heat pump efficiency. If method 400 judges that exterior heat exchanger icing is present, the answer is yes and method 400 proceeds to 405. Otherwise, the answer is no and method 400 proceeds to exit.

At 406, method 400 judges if the vehicle in which the heat pump operates is electrically coupled to a stationary power grid. In one example, method 400 judges that the vehicle is electrically coupled to a stationary power grid when an input to the controller is a value of one based on a voltage sensed at an electrical connector that accepts input from the stationary power grid. If method 400 judges that the vehicle is electrically coupled to a stationary power grid, the answer is yes and method 400 proceeds to 430. Otherwise, the answer is no and method 400 proceeds to 407.

At 407, method 400 judges if the vehicle includes an engine. In one example, a bit stored in memory having a value of one indicates the vehicle includes an engine. The vehicle does not include an engine if the bit has a value of zero. The bit may have a value of zero for a full electric vehicle. The bit may have a value of one for a hybrid vehicle. If method 400 judges that the vehicle includes an engine, the answer is yes and method 400 proceeds to 408. Otherwise, the answer is no and method 400 proceeds to 430 of FIG. 5.

At 408, method 400 judges if cabin heat is being requested. Cabin heat may be requested via a controller or input from a vehicle occupant. In one example, an input to a controller may assume a value of one if cabin heating is requested. In other examples, cabin heating may be indicated by a bit in memory having a value of one. The controller input or bit in memory may have a value of zero when cabin heating is not requested. If method 400 judges that cabin heating is requested, the answer is yes and method 400 proceeds to 410. Otherwise, the answer is no and method 400 proceeds to 409.

At 409, method 400 operates the heat pump in a de-icing mode for a threshold amount of time or until a desired exterior heat exchanger fin temperature is achieved. Method 400 maintains a count of time since the heat pump began operating in de-icing mode and heat exchanger fin temperature is monitored via a temperature sensor. By operating in de-icing mode, the heat pump may remove ice from the exterior heat exchanger without routing refrigerant to the internal heat exchanger. Thus, cooling of the passenger cabin due to operating the heat pump in a cooling mode may be avoided. Method 400 exits after the heat pump is operated in de-icing mode for more than a threshold amount of time or if the exterior heat exchanger fin temperature is greater than a threshold temperature.

At 410, method 400 judges if engine coolant temperature (ECT) is greater than a threshold value. In one example, the threshold value may be a value of a desired cabin temperature. Method 400 determines engine coolant temperature via an engine temperature sensor. If method 400 judges that engine coolant temperature is greater than a threshold temperature, the answer is yes and method 400 proceeds to 412. Otherwise, the answer is no and method 400 proceeds to 420.

At 412, method 400 operates heater core isolation valve (HCIV). Specifically, heater core isolation valve 245 is operated so that coolant may flow from the engine to the heater core 244. Coolant flow from engine 12 to the heater core 244 is stopped when the HCIV is closed. Coolant flows from heater core 244 to HCIV 245 to pump 240 when HCIV is open. Coolant flows from heater core 244 to refrigerant to coolant heat exchanger 211 and then to pump 241 and on to heater core 244 when HCIV is closed. Coolant flows from heater core 244 to HCIV 245 and then to engine 12 before entering pump 240 when HCIV is open. By opening the HCIV, engine coolant may raise the temperature of heater core 244 to supply heat to passenger cabin 220. Method 400 proceeds to 414 after the HCIV is opened.

At 414, method 400 operates the vehicle heat pump in a cooling mode. During cooling mode, exterior heat exchanger 266 is operated as a condenser and internal heat exchanger 276 is operated as an evaporator. Valves 262 and 270 are commanded closed during cooling mode. Expansion valve 274 is at least partially opened to provide a pressure drop and valve 264 is fully opened to provide little or no pressure drop. By operating exterior heat exchanger 266 as a condenser when heat pump subsystem 232 is operated in a cooling mode, exterior heat exchanger fins are warmed to deice exterior heat exchanger 266. A rate of heating of exterior heat exchanger 266 may be increased as compared to when heat pump subsystem 232 is operated in a de-icing mode because heat from passenger cabin 220 is delivered to exterior heat exchanger 266 as well as heat provided by compressor 260. Method 400 proceeds to 416 after the vehicle heat pump begins to operate in cooling mode to de-ice the exterior heat exchanger.

At 416, method 400 judges if the exterior heat exchanger de-icing is complete. In one example, method 400 judges that exterior heat exchanger de-icing is complete when fin temperature reaches a threshold temperature for a predetermined amount of time. If method 400 judges that exterior heat exchanger de-icing is complete, the answer is yes and method 400 proceeds to exit. Otherwise, the answer is no and method 400 returns to 410.

At 420, method 400 operates the heat pump in a de-ice mode. In particular, method 400 operates expansion device 264 with a larger opening amount or valve 271 open so as to provide a small pressure drop across expansion device 264. Additionally, expansion device 274 is bypassed by operating valve 270 so that refrigerant flows from exterior heat exchanger 266 through valve 270 and into bypass 285 before returning accumulator 272. No refrigerant flows through expansion valve 274 or interior heat exchanger 276. Refrigerant exits accumulator 272 and proceeds to compressor 260 before entering refrigerant to coolant heat exchanger 211. Method 400 proceeds to 422 after entering de-icing mode.

At 422, method 400 judges if the heat pump has been operating in the de-icing mode for greater than a threshold amount of time. In one example, the threshold amount of time may be an amount of time less than an amount of time it takes for compressor degradation to begin. If method 400 judges that the heat pump has been operating in de-icing mode for more than a threshold amount of time, the answer is yes and method 400 proceeds to 426. Otherwise, the answer is no and method 400 proceeds to 424.

At 426, method 400 starts the engine or continues to operate the engine if the engine is operating. The engine is operated or continues to operate so that heat may be supplied to the passenger cabin via the engine and heater core 244. Further, heat may be transferred from engine 12 and coolant subsystem 230 to heat pump subsystem 232 via refrigerant to coolant heat exchanger 242. Thermal energy transferred from coolant subsystem 230 may act to further increase a temperature of exterior heat exchanger 266. Method 400 returns to 410 after the engine is activated or continues operating.

At 424, method 400 judges if the exterior heat exchanger de-icing is complete. If method 400 judges that exterior heat exchanger de-icing is complete, the answer is yes and method 400 proceeds to exit. Otherwise, the answer is no and method 400 returns to 410.

At 430, method 400 judges if cabin heat is requested. If method 400 judges that cabin heat is requested, the answer is yes and method 400 proceeds to 440. Otherwise, the answer is no and method 400 proceeds to 432.

At 432, method 400 judges if the heat pump has been operating in a de-icing mode for greater than a threshold amount of time. Method 400 begins counting an amount of time the heat pump is operated in a de-icing mode when the heat pump enters de-icing mode. If method 400 judges that the heat pump has been operating in a de-icing mode for more than a predetermined amount of time, the answer is yes and method 400 proceeds to 438. Otherwise, the answer is no and method 400 proceeds to 434.

At 434, method 400 operates the heat pump in a de-icing mode. By operating the heat pump in a de-icing mode, refrigerant is not sent to the internal heat exchanger so that the possibility of cabin cooling may be reduced. Additionally, method 400 begins to count an amount of time since the heat pump entered de-icing mode. Method 400 proceeds to 436 after entering de-icing mode.

At 436, method 400 judges if the exterior heat exchanger de-icing is complete. In one example, method 400 judges that exterior heat exchanger de-icing is complete when fin temperature reaches a threshold temperature for a predetermined amount of time. If method 400 judges that exterior heat exchanger de-icing is complete, the answer is yes and method 400 proceeds to exit. Otherwise, the answer is no and method 400 returns to 430.

At 438, method 400 operates the heat pump in a cooling mode. The heat pump is operated in a cooling mode to increase an amount of thermal energy directed to exterior heat exchanger 266 as compared to if the heat pump is operated in a de-icing mode. Refrigerant is supplied to the internal heat exchanger in cooling mode, but the heat pump may operate for a shorter time in cooling mode to de-ice the exterior heat exchanger. Method 400 proceeds to 436 after the heat pump enters cooling mode.

At 440, method 400 activates positive temperature coefficient (PTC) electrical heaters if PTC heaters are present. Further, an electrically operated pump and cabin fan may be activated if PTC heaters are present. By activating the PTC heaters, the passenger cabin temperature may be maintained at a desired temperature even when the heat pump is operated in a cooling mode. Method 400 proceeds to 442 after PTC heaters are activated.

At 442, method 400 operates the heat pump in a cooling mode. The heat pump may be operated in cooling mode while the vehicle is coupled to the electrical grid to increase the amount of thermal energy supplied to exterior heat exchanger 266, thereby decreasing an amount of time it takes to de-ice the exterior heat exchanger as compared to if the heat pump were operated in a de-icing mode. However, since PTC heaters are activated at 440, cabin temperature may be maintained or increased via the PTC heaters even though the heat pump is operated in cooling mode. In other words, the PTC heaters may provide more thermal energy to the passenger cabin than is provided to the interior heat exchanger. Method 400 proceeds to 436 after the heat pump begins operating in cooling mode to de-ice exterior heat exchanger 266.

At 450, method 400 judges if cabin heat is requested. If method 400 judges that cabin heat is requested, the answer is yes and method 400 proceeds to 452. Otherwise, the answer is no and method 400 proceeds to 454.

At 452, method 400 operates the heat pump in the de-icing mode for a predetermined threshold amount of time or until a desired exterior heat exchanger fin temperature is achieved. Method 400 operates the heat pump in a de-icing mode to conserve energy while de-icing exterior heat exchanger 266. Further, in de-icing mode, refrigerant is not circulated through interior heat exchanger 276 so there may be less possibility of cooling passenger cabin 220. Method 400 proceeds to exit after the heat pump operates in the de-icing mode for a predetermined amount of time or until exterior heat exchanger fin temperature reaches a predetermined threshold temperature.

At 454, method 400 judges if the heat pump has been operating in de-icing mode for greater than a threshold amount of time. Method 400 keeps track or account of an amount of time the heat pump has been operating in a mode. If method 400 judges that the heat pump has been operating in de-icing mode for more than a threshold amount of time, the answer is yes and method 400 proceeds to 460. Otherwise, the answer is no and method 400 proceeds to 456.

At 456, method 400 operates the heat pump in de-icing mode. Method 400 may operate in a de-icing mode without circulating coolant in the interior heat exchanger for a period of time without passenger cabin temperature being reduced. Method 400 proceeds to 458 after the heat pump begins operating in de-icing mode.

At 458, method 400 judges if the exterior heat exchanger de-icing is complete. If method 400 judges that exterior heat exchanger de-icing is complete, the answer is yes and method 400 proceeds to exit. Otherwise, the answer is no and method 400 returns to 450.

At 460, method 400 activates positive temperature coefficient (PTC) electrical heaters. PTC heaters may be provided in full electric or hybrid vehicles. Further, an electrically operated pump and cabin fan may be activated when PTC heaters are activated. By activating the PTC heaters, the passenger cabin temperature may be maintained at a desired temperature even when the heat pump is operated in a cooling mode. Method 400 proceeds to 462 after PTC heaters are activated.

At 462, method 400 operates the heat pump in a cooling mode. The heat pump may be operated in cooling to increase an amount of thermal energy supplied to the exterior heat pump as compared to if the heat pump is operated in de-icing mode. Consequently, the amount if time it takes to de-ice the exterior heat exchanger may be decreased as compared to if the heat pump were operated in a de-icing mode. Method 400 proceeds to 458 after the heat pump begins operating in cooling mode to de-ice exterior heat exchanger 266.

Thus, method 400 may operate the heat pump in a de-icing mode or a cooling mode to de-ice an exterior heat exchanger. The heat pump may be operated in a cooling mode to de-ice the exterior heat exchanger when exterior heat exchanger icing is more extensive. Operating the heat pump in cooling mode increases an amount of thermal energy transferred to the exterior heat exchanger as compared to if the heat pump is operated in a de-icing mode since thermal energy from the passenger cabin may be transferred to the exterior heat exchanger when the heat pump operates in cooling mode.

Figure 7:
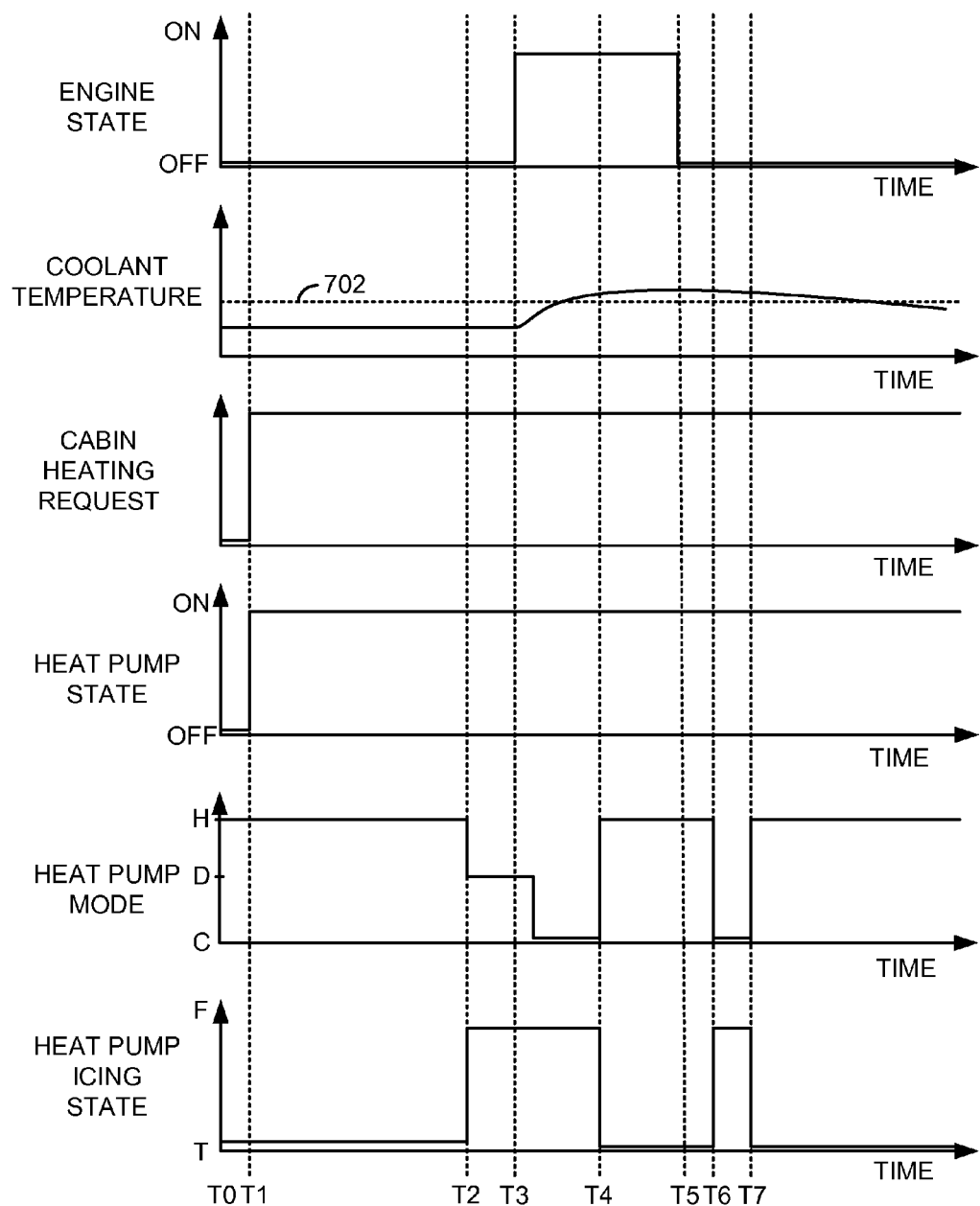
FIG. 7 shows a simulated example sequence for operating a vehicle heat pump according to the method of FIGS. 4-6.

Referring now to FIG. 7, a simulated sequence for operating a vehicle heat pump according to the method of FIGS. 4-6 is shown. The sequence may be performed by a system such as the system shown in FIGS. 1-3. Vertical markers T0-T7 represent times of interest in the sequence. Timings of all plots are aligned together.

The first plot from the top of FIG. 7 is a plot of engine operating state versus time. The engine is combusting air-fuel mixtures when the trace is at a level near the vertical axis arrow. The engine is not combusting air-fuel mixtures when the trace is at a low level near the horizontal axis. The horizontal axis represents time and time increases in the direction of the horizontal axis arrow.

The second plot from the top of FIG. 7 is a plot of engine coolant temperature (e.g., engine temperature) versus time. The vertical axis represents engine coolant temperature and engine coolant temperature increases in the direction of the vertical axis arrow. The horizontal axis represents time and time increases in the direction of the horizontal axis arrow. Horizontal line 702 represents a threshold engine coolant temperature above which the heat pump may be operated in a cooling mode to de-ice an exterior heat exchanger. At engine temperatures less than the level of line 702, the heat pump may only be operated in a de-icing mode for vehicles that include an engine.

The third plot from the top of FIG. 7 is a plot of a passenger cabin heating request versus time. A passenger cabin heating request is asserted when the trace is at a higher level near the vertical axis arrow. A passenger cabin heating request is not asserted when the trace is at a lower level near the horizontal axis. The horizontal axis represents time and time increases from the left side of the plot to the right side of the plot.

The fourth plot from the top of FIG. 7 is a plot of heat pump operating state versus time. The vertical axis represents heat pump operating state. The heat pump is activated when the trace is at a higher level near the vertical axis arrow. The heat pump is deactivated when the trace is at a lower level near the horizontal axis. The horizontal axis represents time and time increases from the left side of the plot to the right side of the plot.

The fifth plot from the top of FIG. 7 is a plot of heat pump operating mode versus time. Heat pump operating modes are indicated along the vertical axis. In this example, the heat pump may be operated in a heating mode (H), a de-icing mode (D), or a cooling mode (C) as indicated by the letters corresponding to the respective mode place along the vertical axis. The heat pump is in a heating mode when the trace is at the level indicated by the letter H along the vertical axis. The heat pump is in a de-icing mode when the trace is at a level indicated by the letter D alone the vertical axis. The heat pump is in a cooling mode when the trace is at a level indicated by the letter C along the vertical axis. The horizontal axis represents time and time increases from the left side of the plot to the right side of the plot.

The sixth plot from the top of FIG. 7 is a plot of heat pump icing state versus time. The vertical axis represents heat pump icing state. The heat pump heat pump is determined to be in an iced state when the trace is at a higher level near the vertical axis arrow. The heat pump is determined to not be in an iced state when the trace is at a lower level near the horizontal axis. The vertical axis represents time and time increases from the left side of the plot to the right side of the plot.

At time T0, the engine is not combusting air-fuel mixtures and the heat pump is off. The heat pump is off or not activated in response to the cabin heating request not being asserted. The heat pump is not in an iced condition and engine coolant temperature is at a value lower than 702.

At time T1, the cabin heating request changes state to indicate cabin heating is requested. Vehicle passengers or a controller may request passenger cabin heating. The heat pump is activated in heating mode in response to the passenger cabin heat request. The heat pump is not in an iced state and the engine is off and at a temperature lower than 702.

At time T2, heat pump icing is indicated by the heat pump icing state transitioning to the higher level while the heat pump is activated. Heat pump icing may be determined based on ambient humidity and exterior heat exchanger fin temperature being less than a threshold temperature. The heat pump enters de-icing mode in response to the heat pump icing state and engine coolant temperature being less than 702. The passenger cabin heating request remains asserted and the engine remains deactivated. The cabin heat request remains asserted.

At time T3, the heat pump has been operating in de-icing mode for more than a threshold amount of time. Therefore, the engine is started to increase engine coolant temperature so that passenger cabin temperature may be maintained while the heat pump is operated in cooling mode to increase warming of the exterior heat exchanger. The heat pump does not immediately enter cooling mode, thereby allowing the running engine to heat engine coolant so as to warm cabin air that passes through the interior heat exchanger. Engine coolant temperature begins to increase after the engine is activated and the cabin heating request remains asserted. The heat pump also remains in a iced state in response to the exterior heat exchanger fin temperature being less than a threshold temperature.

Between time T3 and time T4, the heat pump enters cooling mode in response to the heat pump being in de-icing mode for longer than a threshold. In this example, entering cooling mode is delayed to allow time for the engine to heat engine coolant, but the heat pump may enter coolant mode immediately in other examples. Engine coolant temperature increases and other conditions remain unchanged.

At time T4, the heat pump icing state transitions to a low level to indicate exterior heat exchanger icing is no longer present. Exterior heat exchanger icing may be determined to no longer be present when exterior heat exchanger fin temperature reaches a threshold temperature. The heat pump exits cooling mode and re-enters heating mode in response to the cabin heating request and the absence of exterior heat exchanger icing. The engine remains operating and engine coolant temperature is greater than threshold temperature 702. The heat pump also remains in an active state.

At time T5, the engine is stopped in response to low driver demand torque (not shown) and a higher battery state of charge (not shown). The engine coolant temperature is greater than level 702 and the cabin heat request remains asserted. Further, the heat pump remains activated and the heat pump operates in heating mode as indicated by the heat pump mode. Heat pump icing is not indicated.

At time T6, heat pump icing is indicated by the heat pump icing state. The heat pump mode is transitioned to cooling mode in response to heat pump icing and the engine coolant temperature being greater than level 702. Since the engine coolant temperature is greater than at level 702, engine coolant may be used to heat the passenger cabin even though the heat pump is operated in a cooling mode. By operating the heat pump in cooling mode, additional thermal energy may be provided to the exterior heat exchanger as compared to if the heat pump was operated in de-icing mode. In this way, the exterior heat exchanger de-icing time may be reduced. The heat pump remains activated and the engine remains deactivated.

At time T7, the heat pump is de-iced as indicated by the heat pump icing state transitioning to a lower level. The heat pump mode is transitioned from cooling mode to heating mode in response to the lack of heat pump icing and cabin heating being requested. Further, the heat pump remains activated and the engine coolant temperature is greater than level 702.

In this way, the heat pump operating mode may enter de-icing mode or cooling mode in response to icing of the heat pump exterior heat exchanger and engine coolant temperature. By entering cooling mode when engine coolant temperature is higher than level 702, a rate of exterior heat exchanger de-icing may be increased while passenger cabin temperature is maintained. In particular, thermal energy supplied to the passenger cabin may be increased at the heater core as thermal energy is decreased at the interior heat exchanger to maintain passenger cabin temperature. Likewise, thermal energy supplied to the passenger cabin may be increased at PTC heaters as thermal energy is decreased at the interior heat exchanger to maintain passenger cabin temperature.

As will be appreciated by one of ordinary skill in the art, methods described in FIGS. 4-6 may represent one or more of any number of processing strategies such as event-driven, interrupt-driven, multi-tasking, multi-threading, and the like. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

Thus, the method of FIGS. 4-6 provides for a method for operating a vehicle heat pump, comprising: receiving vehicle heat pump sensor data to a controller; judging a presence or absence of exterior heat exchanger icing via the controller; and operating the vehicle heat pump in a cooling mode via the controller in response judging the presence of exterior heat exchanger icing. The method includes where the vehicle heat pump includes a refrigerant circuit and a coolant circuit. The method includes where the coolant circuit supplies coolant to a heater core in a passenger cabin and where the refrigerant circuit supplies refrigerant to a heat exchanger in the passenger cabin, the coolant circuit isolated from the refrigerant circuit.

In some examples, the method further comprises operating the vehicle heat pump in a de-icing mode in response to judging the presence of exterior heat exchanger icing. The method includes where the vehicle heat pump is operated in the de-icing mode prior to operating the vehicle heat pump in the cooling mode in response to the presence of exterior heat exchanger icing. The method also includes where the vehicle heat pump is operated in the de-icing mode for a predetermined amount of time before operating the vehicle heat pump in the cooling mode. The method includes where an inside heat exchanger (e.g., inside the passenger cabin) operates as an evaporator in the cooling mode and where the exterior heat exchanger (e.g., outside the passenger cabin) operates as a condenser in the cooling mode. The method includes where the heat pump is operated in the cooling mode via the controller in further response to a vehicle in which the vehicle heat pump operates being electrically coupled to a stationary power grid.

The method of FIGS. 4-6 also provides for a method for operating a vehicle heat pump, comprising: receiving vehicle heat pump sensor data to a controller; judging a presence or absence of exterior heat exchanger icing in a refrigerant circuit via the controller; and activating a heating device in a coolant circuit and operating the vehicle heat pump in a cooling mode via the controller in response to judging the presence of exterior heat exchanger icing. The method includes where the heating device is a positive temperature coefficient (PTC) heater. The method includes where the heating device is an engine.

In some examples, the method includes where the heating device is activated after the vehicle heat pump is operated in a de-icing mode in response to the judging of the presence of exterior heat exchanger icing. The method also includes where the de-icing mode is active for a predetermined amount of time before the heating device is activated. The method also includes where the presence of exterior heat exchanger icing is based on a temperature of exterior heat exchanger fins.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle heat pump, comprising:
    receiving vehicle heat pump sensor data at a controller;
    judging a presence of exterior heat exchanger icing via the controller;
    operating the vehicle heat pump in a de-icing mode via the controller in response to judging the presence of exterior heat exchanger icing, where refrigerant bypasses an only one single internal heat exchanger of the vehicle heat pump while operating the vehicle heat pump in the de-icing mode;
    beginning to count an amount of time the vehicle heat pump operates in the de-icing mode starting from when the vehicle heat pump enters the de-icing mode; and
    starting an engine while icing of an exterior heat exchanger is indicated when the amount of time is greater than a predetermined amount of time.

2. The method of claim 1, where the vehicle heat pump includes a refrigerant circuit isolated from a coolant circuit, the only one single internal heat exchanger coupled to the refrigerant circuit, and further comprising:
    operating the vehicle heat pump in a heating mode immediately before operating the vehicle heat pump in the de-icing mode, and heating coolant in the coolant circuit via the vehicle heat pump in the heating mode, the coolant circuit including a heater core.

3. The method of claim 2, where the coolant circuit supplies coolant to the heater core in a passenger cabin and where the refrigerant circuit supplies refrigerant to the only one single internal heat exchanger in the passenger cabin during a cooling mode, the coolant circuit isolated from the refrigerant circuit, and further comprising activating positive temperature coefficient heaters in the coolant circuit.

4. The method of claim 1, further comprising operating the vehicle heat pump in a cooling mode in response to judging the presence of exterior heat exchanger icing.

5. The method of claim 4, where the vehicle heat pump is operated in the de-icing mode prior to operating the vehicle heat pump in the cooling mode in response to the presence of exterior heat exchanger icing.

6. The method of claim 5, further comprising:
    opening a heater core isolation valve in response to an engine coolant temperature being greater than a threshold value and the presence of exterior heat exchanger icing, where coolant flows from a heater core to a refrigerant to coolant heat exchanger when the heater core isolation valve is closed, and where coolant flows from the heater core to the heater core isolation valve and then to the engine before entering a first pump when the heater core isolation valve is open, and providing motive force to coolant supplied to the heater core via a second pump.

7. The method of claim 6, where the only one single internal heat exchanger operates as an evaporator in the cooling mode and where the exterior heat exchanger operates as a condenser in the cooling mode.

8. The method of claim 1, further comprising:
receiving a passenger request for passenger cabin heating and operating the vehicle heat pump in a cooling mode via the controller in response to the passenger request for passenger cabin heating; and
not receiving the passenger request for passenger cabin heating and operating the vehicle heat pump in the de-icing mode in response to not receiving the passenger request for passenger cabin heating and a vehicle in which the vehicle heat pump operates being electrically coupled to a stationary power grid.

9. A method for operating a vehicle heat pump, comprising:
receiving vehicle heat pump sensor data to a controller;
operating the vehicle heat pump in a heating mode and transferring heat from the vehicle heat pump to engine coolant in the heating mode;
judging a presence of exterior heat exchanger icing in a refrigerant circuit via the controller while operating the vehicle heat pump in the heating mode;
activating an engine in a coolant circuit and operating the vehicle heat pump in a cooling mode via the controller in response to judging the presence of exterior heat exchanger icing, where the engine is activated after the vehicle heat pump is operated in a de-icing mode in response to the judging of the presence of exterior heat exchanger icing, where refrigerant is not sent to an only one single internal heat exchanger of the refrigerant circuit while operating the vehicle heat pump in the de-icing mode, and where the vehicle heat pump includes an actual total of one internal heat exchanger.

10. The method of claim 9, further comprising:
activating the engine and operating the vehicle heat pump in the cooling mode in further response to passenger cabin heat being requested, and operating the vehicle heat pump in the de-icing mode in response to passenger cabin heat not being requested and the presence of exterior heat exchanger icing.

11. The method of claim 9, further comprising opening a heater core isolation valve in response to engine coolant temperature being greater than a threshold value.

12. The method of claim 9, further comprising beginning to count an amount of time the vehicle heat pump operates in the de-icing mode starting from when a vehicle enters the de-icing mode, and starting the engine while icing of an exterior heat exchanger is indicated when the amount of time is greater than a predetermined amount of time.

13. The method of claim 9, where the presence of exterior heat exchanger icing is based on a temperature of exterior heat exchanger fins.

* * * * *